United States Patent [19]

Freeman

[11] Patent Number: 4,724,395
[45] Date of Patent: Feb. 9, 1988

[54] MEDIAN FILTER FOR RECONSTRUCTING MISSING COLOR SAMPLES

[75] Inventor: William T. Freeman, Cambridge, Mass.

[73] Assignee: Polaroid Corporation, Cambridge, Mass.

[21] Appl. No.: 947,357

[22] Filed: Dec. 29, 1986

Related U.S. Application Data

[62] Division of Ser. No. 762,627, Aug. 5, 1985.

[51] Int. Cl.[4] .................. H03K 5/153; H03K 5/24; G11C 27/02
[52] U.S. Cl. .................. 328/151; 307/520; 307/353; 307/355; 328/167
[58] Field of Search ............ 307/520, 529, 353, 355, 307/356, 360; 328/151, 167

[56] References Cited

U.S. PATENT DOCUMENTS 3,602,826 8/1971 List et al. ............ 307/355
3,906,400 9/1975 Gooding et al. ............ 328/167
4,127,874 11/1978 Iwasawa et al. ............ 328/167

OTHER PUBLICATIONS

"A Separable Median Filter for Image Noise Smoothing", by P. Narendra, IEEE Transactions on Pattern Analysis and Machine Intelligence, vol. PAMI-3, No. 1, Jan. 1981.

Primary Examiner—John Zazworsky
Attorney, Agent, or Firm—Edward S. Roman

[57] ABSTRACT

Apparatus and method for sensing sampled colored image data and thereafter interpolating the sampled colored image data to provide image data in each color sampled for each point or pixel at which the subject is sensed from which an image of the subject may be constructed having reduced color artifacts and fringing while reducing the blurring to the image that would otherwise be required to correct for such artifacts and fringing.

2 Claims, 12 Drawing Figures

PRIOR ART

FIG 3

PRIOR ART

FIG 4

COLOR A MINUS COLOR B

FIG 5

COLOR A MINUS COLOR B, MEDIAN FILTERED

FIG 6

NEW RECONSTRUCTION FROM SAMPLED DATA

MEDIAN FILTER FOR RECONSTRUCTING MISSING COLOR SAMPLES

This is a division of application Ser. No. 762,627, filed Aug. 5, 1985.

BACKGROUND OF THE INVENTION

1. Field of the Invention

This invention relates generally to an apparatus and method for sensing and interpolating image data and, more particularly, to an apparatus and method for sensing sampled image data and thereafter interpolating for the nonsampled image data in a manner that substantially reduces color fringing.

2. Description of the Prior Art

Electronic imaging cameras for recording still images are well known in the art. Such cameras can record a plurality of still images on a single magnetic disk or tape in either analog or digital format for subsequent playback on any well-known cathode ray tube viewing device. Printers may also be utilized with such cameras in a well-known manner to provide hard copy of the recorded images. Such electronic imaging still cameras may utilize two-dimensional image sensing arrays such as charge coupled devices (CCD's) which integrate incident scene light over a predetermined time to provide an electronic information signal corresponding to the scene light intensity incident to the array. Such two-dimensional image sensing arrays comprise a predetermined number of discrete image sensing elements or pixels arranged in a two-dimensional array in which each image sensing element responds to incident illumination to provide an electronic information signal corresponding to the intensity of the incident illumination.

In order to record color images the incident illumination to the two-dimensional image sensing array is filtered so that different image sensing elements received different colored illumination. The filters are arranged in well-known patterns across the face of the image sensing array such as a repeating pattern of red, green and blue stripes. Alternatively, individual image sensing elements or pixels across each line may be filtered in a repeating pattern of red, green, blue, green filters, as is well known in the art. Since each image sensing element can only detect one color of illumination, the color information for the other colors not detected by that image sensing element must be filled in. Filling in the missing color information is generally accomplished by interpolating the detected image data for each color to determine color values for all the colors for each image sensing element.

Conventional types of interpolation, however, can provide images with objectionable aliasing artifacts such as "color fringes" near sharp edges. The conventional approach to solve this problem is to eliminate the color fringes at the expense of image sharpness by blurring (antialiasing) the picture so that the edges are not sharp enough to create a color fringe. Blurring the image in this manner, however, has its obvious disadvantages resulting in a reduction in resolution and a so-called "fuzzy" picture.

Therefore, it is a primary object of this invention to provide an electronic imaging camera which interpolates sampled color image data in a manner that substantially reduces color fringing without the amount of blurring (antialiasing) otherwise required.

It is an even further object of this invention to provide an electronic imaging camera in which sampled image data is interpolated to provide image data in all the colors for all the image sensing elements while minimizing color artifacts without the amount of blurring (antialiasing) otherwise required.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

An electronic imaging camera comprises an image sensing array having a predetermined number of discrete image sensing elements each of which responds to incident illumination from a subject to provide an electronic information signal corresponding to the intensity of the illumination incident thereto. Means are provided for filtering the illumination incident to the image sensing array so that at least a first group of image sensing elements receives illumination within a first select range of wavelengths and a second group of image sensing elements receives illumination within a second select range of wavelengths different from the first select range. Means are provided for interpolating the electronic information signals from the first group of image sensing elements to provide a first set of electronic information signals corresponding to the intensity of illumination within the first range of wavelengths for both the first and second groups of image sensing elements and for interpolating electronic information signals from the second group of image sensing elements to provide a second set of electronic information signals corresponding to the intensity of illumination within the second range of wavelengths for both the first and second groups of image sensing elements. Means are provided for combining the first and second sets of electronic information signals from the interpolating means and thereafter modifying the combined electronic information signals by replacing the combined electronic information signal corresponding to each image sensing element with a median value of the combined electronic information signals corresponding to a select number of image sensing elements in the vicinity thereof to provide a median electronic information signal for each image sensing element. Means are provided for thereafter combining the median electronic information signal for each image sensing element in the first group of image sensing elements with the electronic information signal originally sensed for that same image sensing element in the first group to provide an output electronic information signal corresponding to the intensity of illumination within the second range of wavelengths for each of the first group of image sensing elements. Means are provided for also combining the median electronic information signal for each image sensing element in the second group of image sensing elements with the electronic information signal originally sensed for that same image sensing element in the second group to provide an output electronic information signal corresponding to the intensity of incident illumination within the first range of wavelengths for each of the second group of image sensing elements.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with accompanying drawings wherein:

DESCRIPTION OF THE PREFERRED EMBODIMENT

As previously discussed, electronic imaging cameras conventionally record color images by using an image sensing array comprising a predetermined number of discrete image sensing elements or pixels arranged in a two-dimensional array in which the image sensing elements respond to incident illumination to provide an electronic information signal corresponding to the intensity of the incident illumination. Such image sensing arrays may be a charge coupled device (CCD) of the frame transfer type. It is well known to sense color images using a single two-dimensional CCD array by filtering the illumination incident to the image sensing array so that different groups of the image sensing elements arranged in well-known patterns across the image sensing array receive different wavelength or colored illumination. Thus, each color of illumination is sampled by each group of image sensing elements and thereafter interpolated to provide color values corresponding to the other groups of image sensing elements. The full color image is therefore estimated or interpolated between the different groups of image sensing elements or pixels to fill in all the colors for each image sensing element or pixel.

Figure 1:
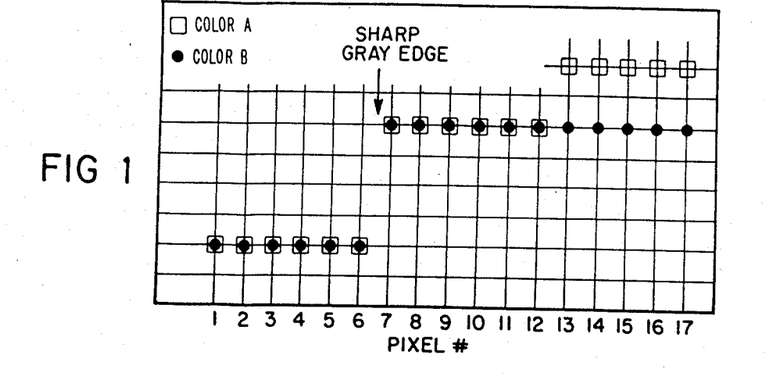
FIG. 1 is a graphical representation of an example of the distribution of light intensity incident to an image sensing array.

Conventional types of interpolation provide images with objectionable aliasing artifacts such as color fringes near sharp edges. As previously discussed, the conventional solution to this problem is to eliminate the color fringes at the expense of image sharpness by blurring (antialiasing) the reproduced image so that the edges are not sharp enough to create a color fringe. An example of how a sharp edge in a subject to be recorded can create color fringes when the image of the subject is reconstructed using conventional interpolation methods will now be discussed. Referring now to FIG. 1, there is shown a graphical representation of the light intensity distribution incident to an image sensing CCD array comprising, for example, 17 individual image sensing elements or pixels. For simplicity it will be assumed that the illumination comprises two colors A and B wherein each color is defined by a select range of wavelengths different from the select range of wavelengths which defines the other color. As is readily apparent from the graph of FIG. 1, the incident illumination defines a sharp grey edge between the pixels 6 and 7 and a sharp grey to color transition between pixels 12 and 13.

Figure 2:
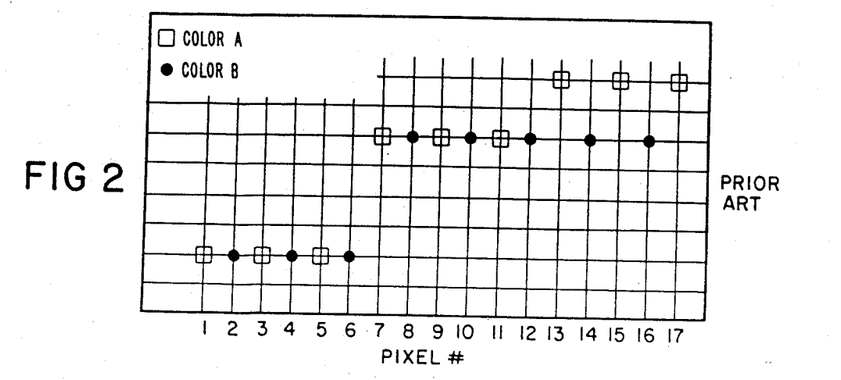
FIG. 2 is a graphical representation of the illumination incident to the image sensing array of FIG. 1 having a filter arrangement in which alternate image sensing elements are overlapped by different colored filters.

Referring now to FIG. 2, there is shown a graphical representation of the illumination incident to an image sensing CCD array having a filter arrangement in which alternate image sensing elements or pixels are overlapped by filters transmitting either color A or color B. Thus, each image sensing element or pixel receives a single color of illumination, and linear interpolation between the image sensing elements or pixels which sample each color provides the color distribution as shown graphically in FIG. 3. As is now readily apparent, the image sensing elements or pixels 6 and 7 on each side of the grey edge no longer provide equal intensities for the colors A and B and thus will provide a highly visible color artifact or fringe in the reconstructed image.

Figure 7:
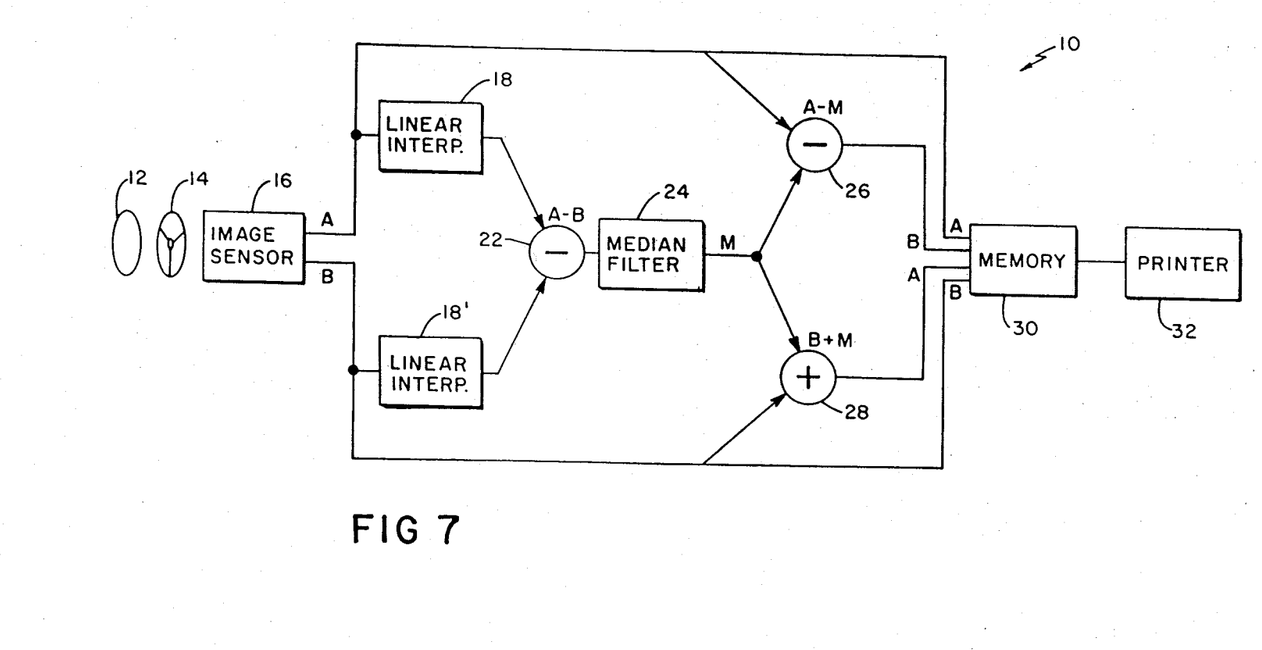
FIG. 7 is a schematic block diagram for an electronic imaging camera which interpolates image data in the manner of this invention.

Referring now to FIG. 7 there is shown a schematic diagram for an electronic imaging camera 10 which interpolates image data in the manner of this invention so as to avoid creating the aforementioned color fringes. The electronic imaging camera 10 comprises an objective lens 12 for directing scene light by way of a shutter 14 to an image sensing array 16. The shutter 14 is controlled in a conventional manner by means not shown. The image sensing array 16 comprises a predetermined number of discrete image sensing elements or pixels arranged in a two-dimensional array in which the image sensing elements respond to incident illumination to provide an electronic information signal corresponding to the intensity of the incident illumination. As previously discussed, the image sensing array may comprise a charge coupled device (CCD) of the frame transfer type.

Figure 3:
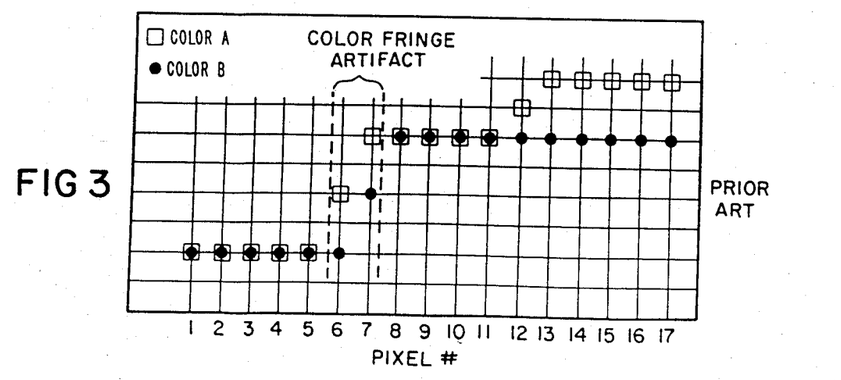
FIG. 3 is a graphical representation of the distribution of linearly interpolated color light intensity values for the image sensing elements of the image sensing array of FIG. 1.

The electronic information signal output corresponding to the color A is directed to a conventional linear interpolator 18 which interpolates the sampled A color information to provide an electronic information signal for each image sensing element or pixel corresponding to the color A as shown in FIG. 3. In like manner, the electronic information signals corresponding to the color B are directed to a linear interpolator 18' in which the sampled B color information is interpolated to provide an electronic information signal for each image sensing element or pixel corresponding to the color B as also shown in FIG. 3.

Figure 4:
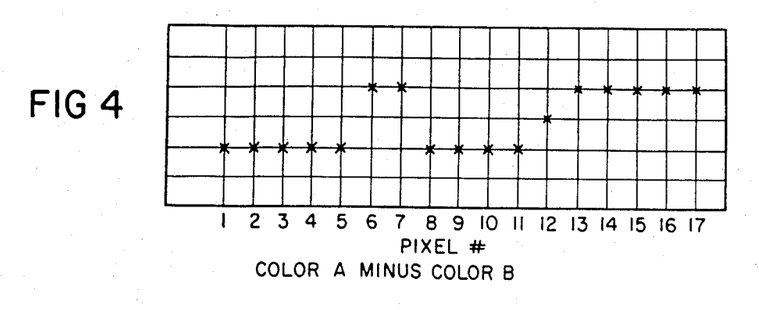
FIG. 4 is a graphical representation showing the difference between the two color light intensity values for each image sensing element of the image sensing array of FIG. 1.

The output electronic information signals from the linear interpolators 18 and 18', in turn, are directed to a subtractor 22 which operates to subtract the electronic information signals corresponding to color B from the electronic information signals corresponding to color A to provide an output which is shown graphically in FIG. 4. The graph of FIG. 4 shows that the difference between the colors A and B rapidly increases and then decreases in the area of the sharp grey edge between pixels 6 and 7. It is this rapid increase and decrease in the difference between the two colors which is characteristic of the objectionable color fringing and not simply a sudden rise in the difference between colors A and B as occurs after pixel 11 and which is indicative of a change from one color to a different color. Thus, it is unlikely that a real scene would result in the creation of such a color spike at the pixels 6 and 7, and it is not desirable to create such a color spike as a result of the method of interpolation chosen.

Figure 5:
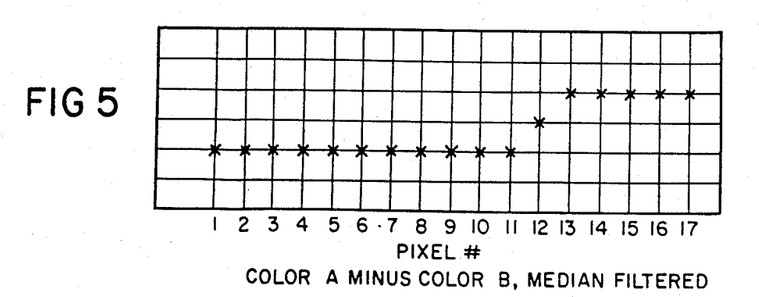
FIG. 5 is a graphical representation of the color light intensity values of FIG. 4 subsequent to median filtering.

A better estimate of the actual difference between the values for the colors A and B is provided by the graphical representation of FIG. 5 where the sharp peaks and valleys are removed and the other sharp transitions retained. Toward this end there is provided a median filter 24 which replaces the value as shown graphically in FIG. 4 for each image sensing element or pixel with the median value of a predetermined number of neighboring image sensing elements or pixels. Thus, the median filter 24 has a width of N image sensing elements or pixels and operates to replace each value in the graph of FIG. 4 with the median value of the nearest N image sensing elements or pixels. For example, if the width of the median filter 24 is selected to be five image sensing elements or pixels, then the value at pixel 6 will become the median value of the pixels 4, 5, 6, 7 and 8. When the values for the pixels 4, 5, 6, 7 and 8 are sorted into descending order and counted down three from the top, it becomes readily apparent that the median value for the pixel 6 is 0 and thus the median filter 24 operates to substitute the value 0 for the pixel 6. Although the median filter 24 operates to remove sharp spikes and valleys, it will leave sharp monotonically increasing or decreasing edges intact as occurs between pixels 11 and 13 in FIG. 4. Thus, the electronic information output signal from the median filter 24 is shown graphically in FIG. 5 with the sharp spike at pixels 6 and 7 removed and the increasing edge of pixels 11 and 13 intact. Although a median filter is described for the preferred embodiment, the invention is by no means so limited and other types of filters such as other nonlinear filters or low pass, high pass filters, etc. could alternatively be utilized.

Figure 6:
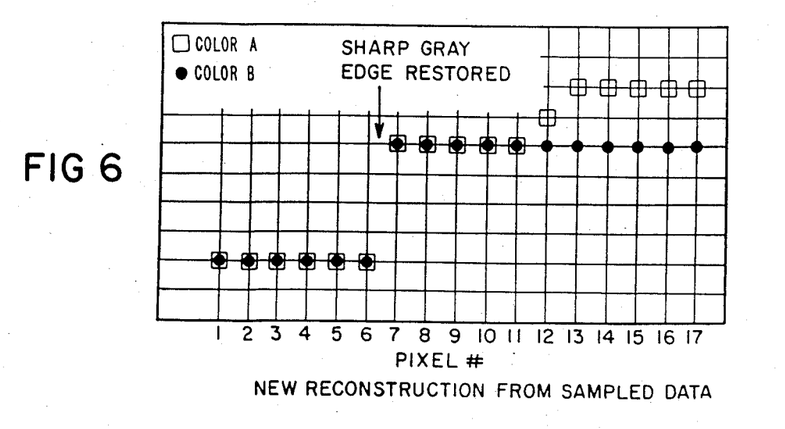
FIG. 6 is a graphical representation of the color light intensity values of both colors detected by the image sensing array of FIG. 1 interpolated in the manner of this invention.

Since the median values for each pixel are derived from the values of color A minus the values of color B for each pixel, directing the median values to a subtractor 26 for subtraction from the values for the color A operates to provide the values for the color B for those image sensing elements or pixels that receive only A colored light. In like manner, the median output values from the median filter 24 are directed to an adder 28 for addition to the values for the color B to provide the A colored light values for those picture sensing elements or pixels that receive only B colored light. In this manner there is provided an interpolated value for the B colored light for each picture sensing element or pixel that senses only the A colored light and, conversely, an interpolated value for the A colored light is provided for each picture sensing element or pixel that senses only the B colored light as best shown by the graphical representation of FIG. 6. As is now readily apparent, the interpolation technique of this invention operates to actively reconstruct the sharp grey edge between the pixels 6 and 7 while maintaining the color divergence starting at the pixel 11.

Figure 8:
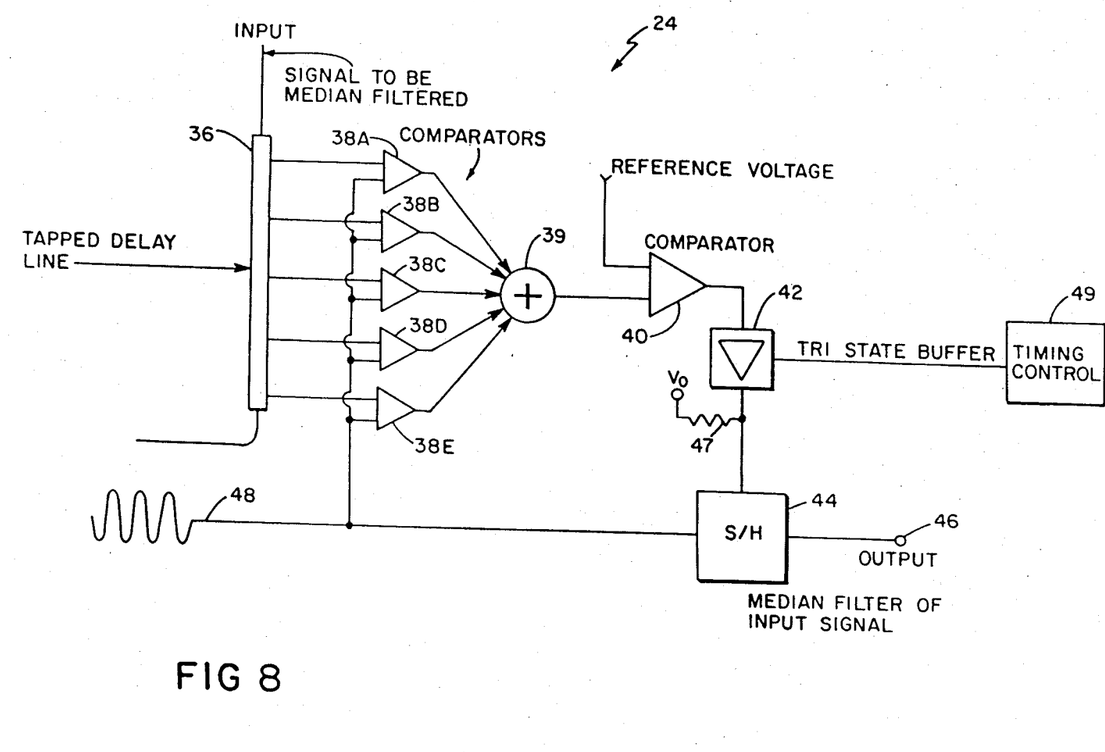
FIG. 8 is a schematic circuit diagram for the median filter of FIG. 7.

Referring now to FIG. 8 there is shown a circuit diagram for the median filter 24 comprising a tapped delay line 36 connected to receive the input signal from the subtractor 22. Each output line from the tapped delay line 36, in turn, connects to a respective input line of a plurality of comparators 38A through 38E. The other input terminals to the comparators 38A through 38E, in turn, are in common connection with respect to each other and receive a varying voltage 48 also shown in FIG. 10A which varies over the range in which the electronic information signals from the image sensing elements or pixels varies. The output signals from the comparators 38A through 38E, in turn, are directed for summation by an adder 39 which, in turn, provides an output signal to another comparator 40. The other input terminal to the comparator 40 is connected to a predetermined reference voltage, and the output terminal from the comparator 40 is directed to a tristate buffer 42. The output from the tristate buffer 42, in turn, operates to control a sample and hold circuit 44 which samples the value of the varying voltage 48 and upon the actuation thereof holds the value of the voltage 48 at output terminal 46. A pull-up resistor 47 connected between the output from the tristate buffer 42 and a supply voltage $V_0$ operates to provide an affirmative enabling signal to the sample and hold circuit 44 when the tri-state buffer is disabled in a manner as will be subsequently described.

During operation, the voltage values corresponding to a plurality of adjacent picture sensing elements or pixels are serially directed to the tapped delay line 36 so as to connect the input to each one of the comparators 38A through 38E to a value corresponding to a respective one of the selected number of picture sensing elements or pixels chosen to define the median filter width. As the voltage level 48 at the input node gradually increases, comparators 38A through 38E switch to provide high (binary logic 1) affirmative enabling signals which when added together by the adder 30 operate to switch the comparator 40 at the median filter value.

For example, in the illustrated embodiment of FIG. 8 there are provided five comparators 38A through 38E which may each provide a 5 volt affirmative (binary logic 1) output voltage upon being switched. Thus, as is now readily apparent, an output from the adder 39 of 15 volts occurs when the median comparator of the comparators 38A through 38E switches as a function of the gradually increasing voltage 48. The 15 volt output from the adder 39, in turn, operates to switch the comparator 40 which provides an affirmative output signal to the input of the tristate buffer 42.

Figure 10A:
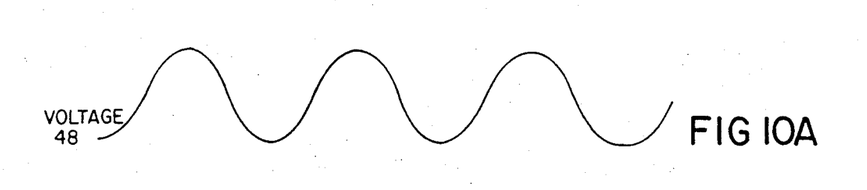
FIGS. 10A-10C are graphical representations for different voltage waveforms at different nodes of the circuit of FIG. 8.
Figure 10B:
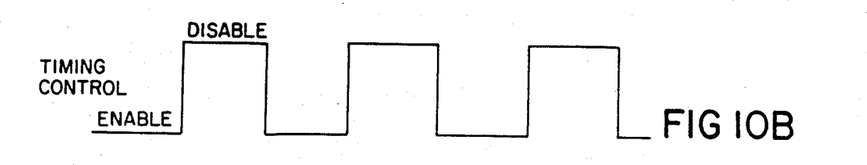
Figure 10C:
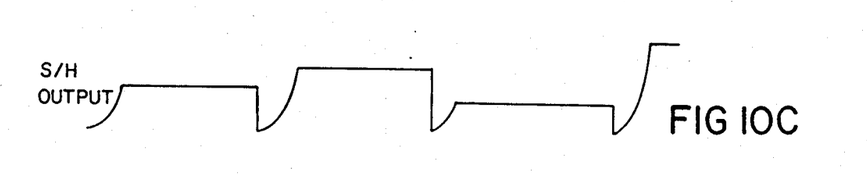

The tristate buffer 42 is controlled by a timing signal as shown in FIG. 10B from a timing control circuit 49 so as to be enabled when the varying voltage 48 increases and disabled when the varying voltage 48 decreases as best shown in FIGS. 10A and 10B. Before the comparator 40 provides its affirmative output signal, the controlling signal to the sample and hold circuit 44 is held low by the output of the comparator 40. The sample and hold circuit 44 therefore samples the gradually increasing voltage 48; and, when the comparator 40 provides its affirmative output signal, that signal passes through the tristate buffer 42 since it is enabled and causes the sample and hold circuit 44 to hold the voltage value sampled at that instant from the varying voltage 48 at the output terminal 46. In this manner there is provided the median output voltage corresponding to each picture sensing element or pixel as determined from the values corresponding to at least four more adjacent picture sensing elements or pixels as shown in FIG. 10C. As is readily apparent, the number of comparators 38A through 38E may be increased or decreased to vary the number of picture sensing elements or pixels from which each median value is determined.

After the varying voltage 48 reaches its peak and begins to decrease, the output of the tristate buffer 42 is disabled by the timing signal as shown in FIG. 10B from the timing control 49, and the input signal level to sample and hold circuit 44 is held high by the pull-up resistor 47 causing the sample and hold circuit 44 to continue to hold the median voltage level until varying voltage 48 begins to rise again and the median value of the next group of pixels is about to be determined. It is readily apparent that the output 46 could be the input to a second sample and hold circuit (not shown) which could sample the output signal during the descending portion of the varying voltage 48 and hold the sampled median voltage during the rising part of the next succeeding cycle of the varying voltage 48. Thus, the output signal at all times would represent a median output value.

Figure 9:
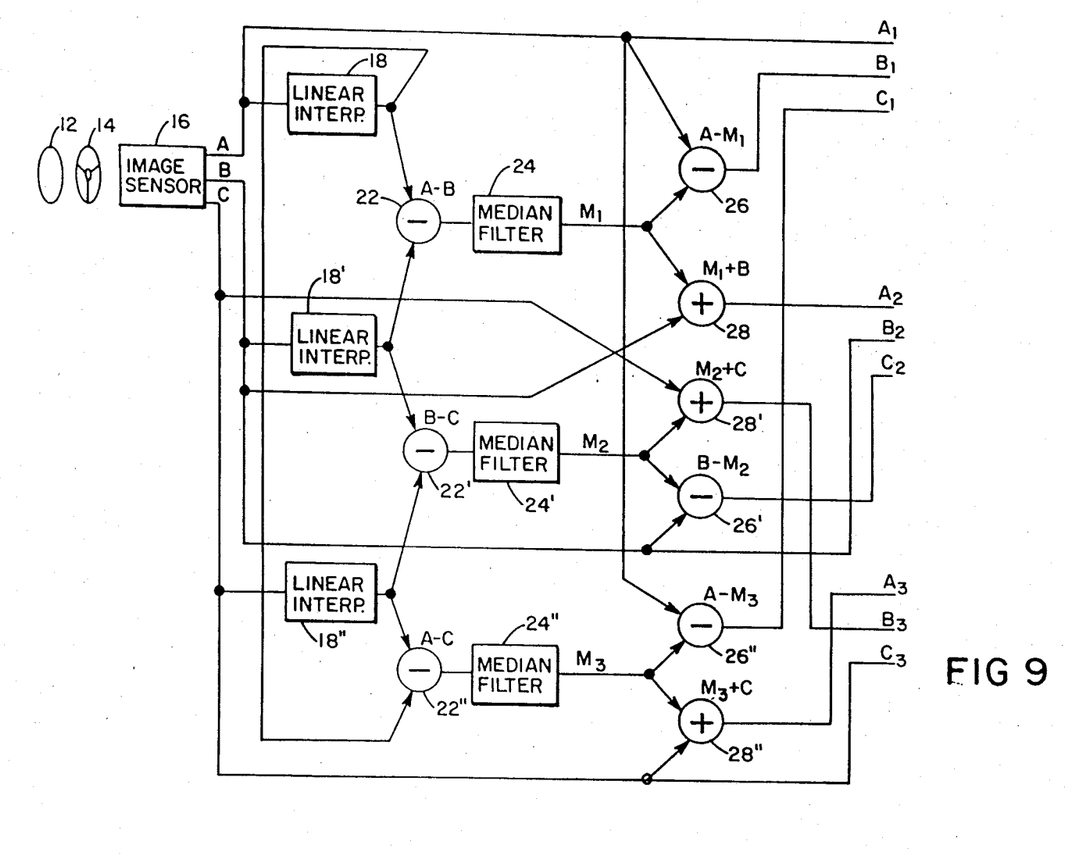
FIG. 9 is a schematic block diagram for an alternate embodiment to the electronic imaging camera of FIG. 7.

The two color system of FIG. 7 may be expanded to a three color system as shown in FIG. 9 where like numerals designate previously described elements. The image sensor 16 provides output electronic information signals corresponding to three different colors or wavelengths of incident illumination A, B and C which may, for example, be red, green and blue. Electronic information signals A derived from sensing the A colored illumination are directed to the linear interpolator 18 for interpolating values for the A colored illumination for those image sensing elements or pixels which are filtered to receive the B colored illumination and the C colored illumination. In like manner, the electronic information signals B derived from sensing the B colored illumination are directed to the linear interpolator 18' to interpolate those values for the B colored illumination corresponding to the image sensing elements or pixels which are filtered to receive the A and C colored illumination. Again, in like manner, the electronic information signals C derived from sensing the C colored illumination are directed to the linear interpolator 18" to interpolate the values for the C colored illumination corresponding to the image sensing elements or pixels which are filtered to receive the A and B colored illumination.

The subtractor 22 operates in the aforementioned manner to provide a value corresponding to the difference between the A and B colored illumination for each light sensing element or pixel which output is thereafter directed to the median filter 24 for filtering in the aforementioned manner. The electronic information output signals from the median filter 24 are thereafter subtracted from the output values sensed for the A colored illumination by the subtractor 26 to provide values $B_1$ corresponding to the B colored illumination for each image sensing element or pixel that is filtered to receive the A colored illumination. The electronic information output signals from the median filter 24 are also added to the output values sensed for the B colored illumination by the adder 28 to provide values $A_2$ corresponding to the A colored illumination for each image sensing element or pixel that is filterd to receive the B colored illumination. The subscript 1 denotes values for the A, B and C colored illumination for those image sensing elements or pixels which are filtered to receive the A colored illumination. In like manner, the subscript 2 denotes values for the A, B and C colored illumination for those image sensing elements or pixels that are filtered to receive the B colored illumination while the subscript 3 denotes values for the A, B and C colored illumination for those image sensing elements or pixels which are filtered to receive the C colored illumination.

The linear interpolator 18" operates in the aforementioned manner to provide output values for the C colored illumination corresponding to those image sensing elements or pixels which are filtered to receive the A and B colored illumination. The output from the linear interpolator 18" is subtracted from the output from the linear interpolator 18' and thereafter median filtered by the median filter 24' to provide median values which are thereafter combined by the adder 28' with the values sensed for the C colored illumination to provide output values $B_3$ for the B colored illumination corresponding to those light sensing elements or pixels filtered to receive the C colored illumination. In like manner, the output from the median filter 24' is also combined by the subtractor 26' with the output values sensed for the B colored illumination to provide output values $C_2$ corresponding to the C colored illumination for those image sensing elements or pixels filtered to receive the B colored illumination.

The output from the linear interpolator 18" is also directed to another subtractor 22" for subtraction from the A colored values interpolated by the linear interpolator 18. The output from the subtractor 22", in turn, is directed to the median filter 24" to provide an output in the aforementioned manner which is subsequently subtracted from the values sensed for the A colored illumination by a subtractor 26" to provide the output values $C_1$ corresponding to the C colored illumination for those image sensing elements or pixels filtered to receive the A colored illumination. In like manner, the output from the median filter 24" is directed to another adder 28" for addition to the output values sensed for the C colored illumination to provide output values $A_3$ corresponding to the A colored illumination for those light sensing elements or pixels filtered to receive the C colored illumination. Thus, in this manner there is provided an interpolated value for each of the three colors A, B and C for each image sensing element or pixel.

The aforementioned invention is also applicable to linear light sensing arrays, and the illustrated embodiment could alternatively comprise the processing of a single line of a linear light sensing array.

Other embodiments of the invention, including additions, subtractions, deletions and other modifications of the preferred disclosed embodiments of the invention will be obvious to those skilled in the art and are within the scope of the following claims.

What is claimed is:
1. A median filter comprising:
a delay line for receiving an ordered sequence of electronic information signals, said line having a plurality of tapped output terminals therefrom each of which provides one electronic information signal, respectively, from said ordered sequence;

a plurality of comparators each having one input terminal connected to a respective one of said plurality of tapped output terminals and the other input terminal connected to receive a source of varying voltage;

means for combining the output signals from said plurality of comparators to provide a combined output signal;

means for comparing said combined output signal with a select reference voltage level and for providing an affirmative output voltage level upon said combined output signal equaling said select reference voltage level; and means for sampling and holding the voltage level of the source of varying voltage responsive to said affirmative output voltage.

2. The filter of claim 1 including a tristate buffer circuit which can be selectively enabled and disabled in response to said affirmative output voltage for actuating said means for sampling and holding to sample and hold the voltage level of the source of varying voltage, means for timing the enablement and disablement of said tristate buffer circuit in order to provide succeeding median electronic information signals and resistor means for maintaining said actuation of said means for sampling and holding upon the disablement of said tristate buffer circuit.

* * * * *